United States Patent [19]
Enko et al.

[11] Patent Number: 6,078,944
[45] Date of Patent: Jun. 20, 2000

[54] PROCESS MANAGEMENT METHOD AND SYSTEM

[75] Inventors: Yutaka Enko, Yokohama; Toshiaki Arai, Machida; Reki Yamamoto, Tokyo; Naofumi Shouji, Yokohama; Tomoki Sekiguchi, Yokohama; Tsutomu Noda, Yokohama; Tsuyoshi Watanabe, Machida; Tetsuya Mochida, Ebina, all of Japan

[73] Assignee: Hitachi, Ltd., Tokyo, Japan

[21] Appl. No.: 08/831,303

[22] Filed: Apr. 1, 1997

[30] Foreign Application Priority Data

Apr. 2, 1996 [JP] Japan .................................. 8-079826

[51] Int. Cl.[7] ...................................................... G06F 9/00
[52] U.S. Cl. ............................................................ 709/105
[58] Field of Search ............................. 395/200.43, 675, 395/800.14; 709/213, 105; 712/14

[56] References Cited

U.S. PATENT DOCUMENTS

| | | | |
|---|---|---|---|
| 5,261,053 | 11/1993 | Valencia .................................. | 711/133 |
| 5,506,987 | 4/1996 | Abramson et al. ...................... | 709/103 |
| 5,592,671 | 1/1997 | Hirayama ................................ | 709/104 |
| 5,745,778 | 4/1998 | Alfieri .......................................... | 712/1 |
| 5,832,262 | 11/1998 | Johnson et al. .......................... | 709/102 |
| 5,872,972 | 2/1999 | Boland et al. ........................... | 709/102 |
| 5,924,097 | 7/1999 | Hill et al. .................................. | 707/10 |

OTHER PUBLICATIONS

Tanenbaum, "Modern Operating Systems", Prentice Hall, 1992, Chapter 12, pp. 507–548.

Milojicic et al., "Experiences with Load Distribution on top of the Mach Microkernel", 4th Symposium on Experiences with Distributed and Multiprocessor Systems, San Diego, Sep. 1993, pp. 19–36.

Milojicic, et al., "Load Distribution on Microkernels", 4th IEEE Workshop on Future Trends in Distributed Computing, Lisbon, Portugal, Sep. 1993, pp. 463–469.

*Primary Examiner*—Kenneth R. Coulter
*Attorney, Agent, or Firm*—Antonelli, Terry, Stout & Kraus, LLP

[57] ABSTRACT

The parallelism of execution of processes in a memory shared multi-processor is enhanced. Each of a plurality of processors is provided with a run queue for holding executable processes, and a watch process for each processor to watch the execution status of its own to notify the rebuilding of the run queue to other processor and a rebuild step for rebuilding the run queue in response to the notice are stored in a shared memory as a program.

13 Claims, 13 Drawing Sheets

PROCESS MANAGEMENT METHOD AND SYSTEM

BACKGROUND OF THE INVENTION

The present invention relates to process management method and system for a memory shared multi-processor computer in which a plurality of processor elements share a main memory and each processor element extracts a process from a run queue which holds executable processes and executes it.

A computer system in which a plurality of processor elements are interconnected and each processor element parallelly conducts an operation is referred to as a multi-processor system. Of those, a system in which each processor element shares a memory (information storage means) through a shared bus is referred to as a memory shared type or a TCMP (Tightly Coupled Multi-Processor) system. (Computer Architecture: Design and Performance, Barry Wilkinson, 1991, Prentice Hall, Chapters 6 to 7.)

Hereinafter, the memory shared multi-processor system is simply referred to as a multi-processor system.

A process is a logical unit for execution of calculation based on a program and a program counter, a stack, external variables, a file descriptor and signals are managed independently for each process.

A thread is a unit of execution of the process by the processor. The thread is included in one of the processes and a process includes one or more threads.

Each thread manages the program counter, the stack and the tread management table for each thread, and shares the program, the external variables, the file descriptor and other information with other thread in the process. Whether the signals are to be handled by process unit or by thread unit depends on the implementation.

Usually, in the multi-processor system, the multi-processing or the multi-thread control is conducted to parallelly execute a plurality of processes or threads for each processor.

Each processor in the multi-processor computer of the multi-process system executes the processes assigned to itself parallelly by switching them.

For the management of the process to be executed by each processor, a data structure referred to as a run queue is used.

The run queue manages an executable process (a process which is sleeping to wait for any event and a process being executed by the processor are not executable processes).

Usually, the switching of the processes and the setting/removing of the processes for each run queue are conducted by an OS (operating system) operation on the system. An OS which conducts the multi-processing control on the multi-processor system is described in Modern Operating System, Andrew S. Tanenbaum, Prentice Hall, 1992, Chapter 12, pages 507–548.

In the system, in order to enhance the parallelism of the multi-processor to improve a throughput of the system, techniques to keep loads to the processors as uniformly as possible have been known. As one of them, a technique of processor-to-processor migration of the processes has been known.

When the migration is not conducted, the processor which executes the process is fixed to the processor which created the process during the period from the creation to the expiration of the process. When the process migration is conducted, the processor which executes the process is changed between the creation and the expiration of the process, namely, the process is migrated between processes.

By using the process migration, the unbalance of process loads among the processors may be relieved and the load balance may be adjusted by migrating the process from a high load processor to a low load processor.

The process migration may be statistically conducted by a compiler or the system may determine the migration at the execution of the process. In the present specification, dynamic load distribution which determines the migration at the execution without relying on the compiler is specifically discussed.

Examples of the migration among processors interconnected through a network are described in Load Distribution on Microkernels; D. Milojicic, P. Giese; IEEE Workshop on Future Trend in Distributed Computing; Lisbon, Portugal, September 1993, pp. 463–469, and Experiences with Load Distribution on Top of the March Microkernels; D. S. Milojicic, P. Giese and W. Zint; 4th Symposium on Experiences with Distributed and Multi-Processor Systems; San Diego, September 1993, pp. 19–36. In those references, a receiver initiate type process migration in which a low load processor (receiver) requests the migration of process to a high load processor (sender). In those references, the number of processes and the frequency of process-to-process communication are used as selection criteria of the sender/receiver processors.

In the prior art process migration, the migration among the computers interconnected through the network is primarily discussed. On the other hand, in a model such as a tightly coupled multi-processor in which the data transfer among the processors is conducted through a shared memory, a condition is different from that of the data transfer conducted through the network.

For example, in the computers through the network, even if information on the load balance of the computers is collected and it is determined to conduct the migration between particular nodes, a relatively long time is required before the migration is completed and the load balance of the system may change during that time and the migration which results in a small effect or is not necessary may be conducted. Accordingly, it is necessary to conduct the migration only for the unbalance which last for a long time. Further, since an overhead per migration is large, an affect to the throughput of the overall system should be taken into consideration.

In the tightly coupled multi-processor, the overhead (cost) for migrating the process between nodes is smaller than that of the multi-processor through the network. Further, a time required to complete the migration is shorter. Thus, a strategic method to conduct the migration more frequently to the variation of load may be adopted.

SUMMARY OF THE INVENTION

It is an object of the present invention to provide a process management system which can improve the parallelism of execution of process in a memory shared multi-processor.

In a multi-processing type memory shared multi-processor computer having a process management system of the present invention, a plurality of processors share a main memory and each of the processors is provided with a data structure (run queue) for holding executable processes. In order to achieve the object of the present invention, a watch step for watching an execution status of each processor to notify the rebuilding of the run queue and a rebuild step for rebuilding the run queue in response to the notice are stored in a shared memory as a program.

In the computer having the above steps, when processes to be executed in one processor is exhausted, the watch step notifies the rebuilding to the rebuild step by setting the one processor as a process migration target processor.

Or when processes to be executed in one processor are exhausted and that state lasts for a predetermined time, the watch step notifies the rebuilding to the rebuild step by setting the one processor as a process migration target processor.

Or when a processor use factor of one processor calculated at a predetermine time interval is not larger than a threshold, the watch step notifies the rebuilding to the rebuild step by setting the one processor as a process migration target processor.

Or the watch step calculates a processor use factor at a predetermined time interval, and when the use factor of one processor is not larger than a first threshold and a use factor of any one of other processors is not smaller than a second threshold, the watch step notifies the rebuilding to the rebuild step by setting the processor having the use factor not larger than the first threshold as a process migration target processor.

Further, the rebuild step selects the least recently executed process in the processed included in the longest run queue and migrating the selected process to the run queue of the process migration target processor.

Or the rebuild step selects the least recently executed process in the processes included in the run queue corresponding to the processor having the largest processor use factor of the plurality of processors and migrating the selected process to the run queue of the process migration target processor.

Or the rebuild step selects the process having the smallest number of times of sleep for waiting the occurrence of an event in the computer after the creation of the process, from the processes included in the run queue corresponding to the processor having the largest processor use factor in the plurality of processors and migrates the selected process to the run queue of the process migration target processor.

Or the rebuild step selects the process having the largest processor occupation factor from the processes included in the run queue corresponding to the processor having the largest processor use factor in the plurality of processors and migrates the selected process to the run queue of the process migration target processor.

Or the rebuild step selects the process having the smallest processor occupation factor from the processes included in the run queue corresponding to the processor having the largest processor use factor in the plurality of processors and migrates the selected process to the run queue of the process migration target processor.

Or the rebuild step selects the process having the smallest working set size from the processes included in the run queue corresponding to the process having the largest processor use factor in the plurality of processors and migrates the selected process to the run queue of the process migration target processor.

Or the rebuild step selects the process having the largest working set size from the processes included in the run queue corresponding to the processor having the largest processor use factor in the plurality of processors and migrates the selected process to the run queue of the process migration target processor.

DETAILED DESCRIPTION OF THE PREFERRED EMBODIMENTS

Figure 1:
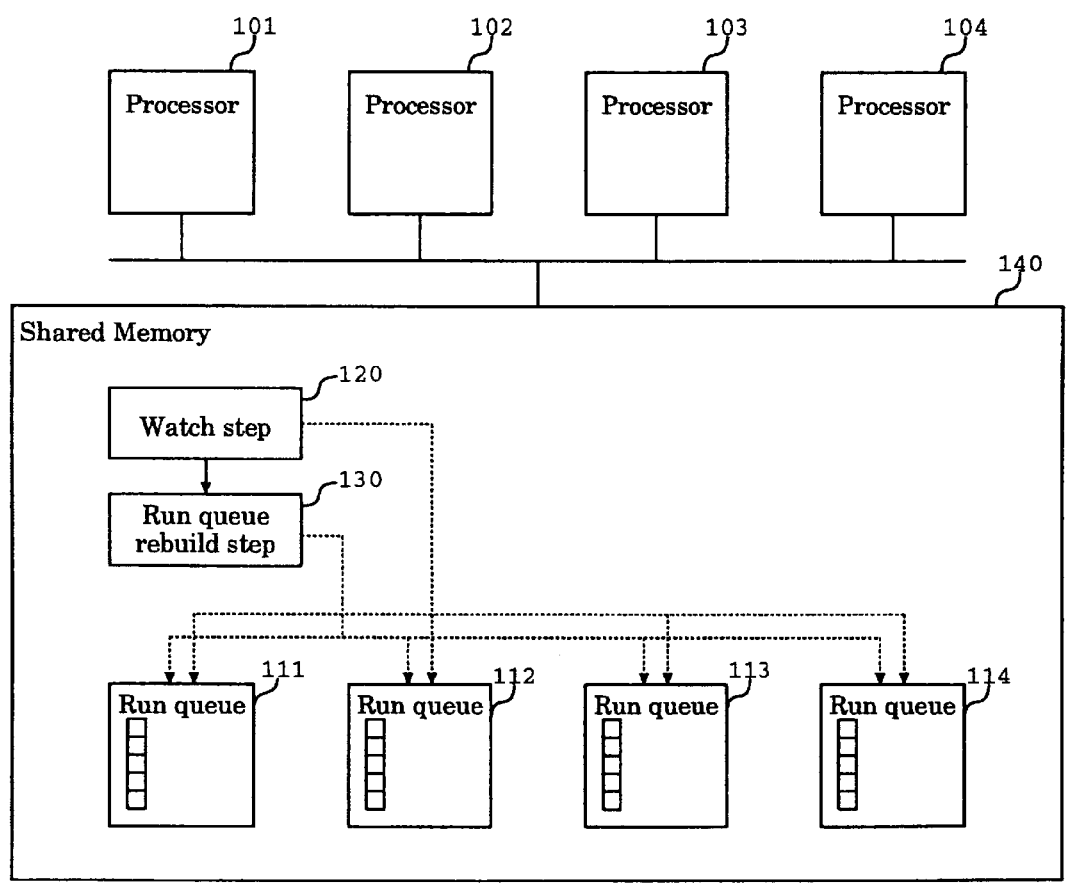
FIG. 1 shows a block diagram of a computer system in accordance with the present invention.

FIG. 1 shows a configuration of an overall computer system for managing processes in accordance with the system of the present invention. The present computer comprises processors 101, 102, 103 and 104 each of which shares a main memory (shared memory) 140 which is provided with run queues 111, 112, 113 and 114 dedicated to each processor.

Each processor extracts a process from the run queue which holds executable processes and executes it.

A control mechanism of the process management system of the present invention is loaded as a program on the main memory and a watch step 120 and a run queue rebuild step 130 manage the processes. A program for the watch step 120 and the rebuild step 130 may be stored in a transportable recording medium such as a floppy disk and it may be read into the shared memory for start-up at the execution.

Solid lines in FIG. 1 show directions of flow of execution of operation, and broken lines show directions of control of data structure.

Figure 3:
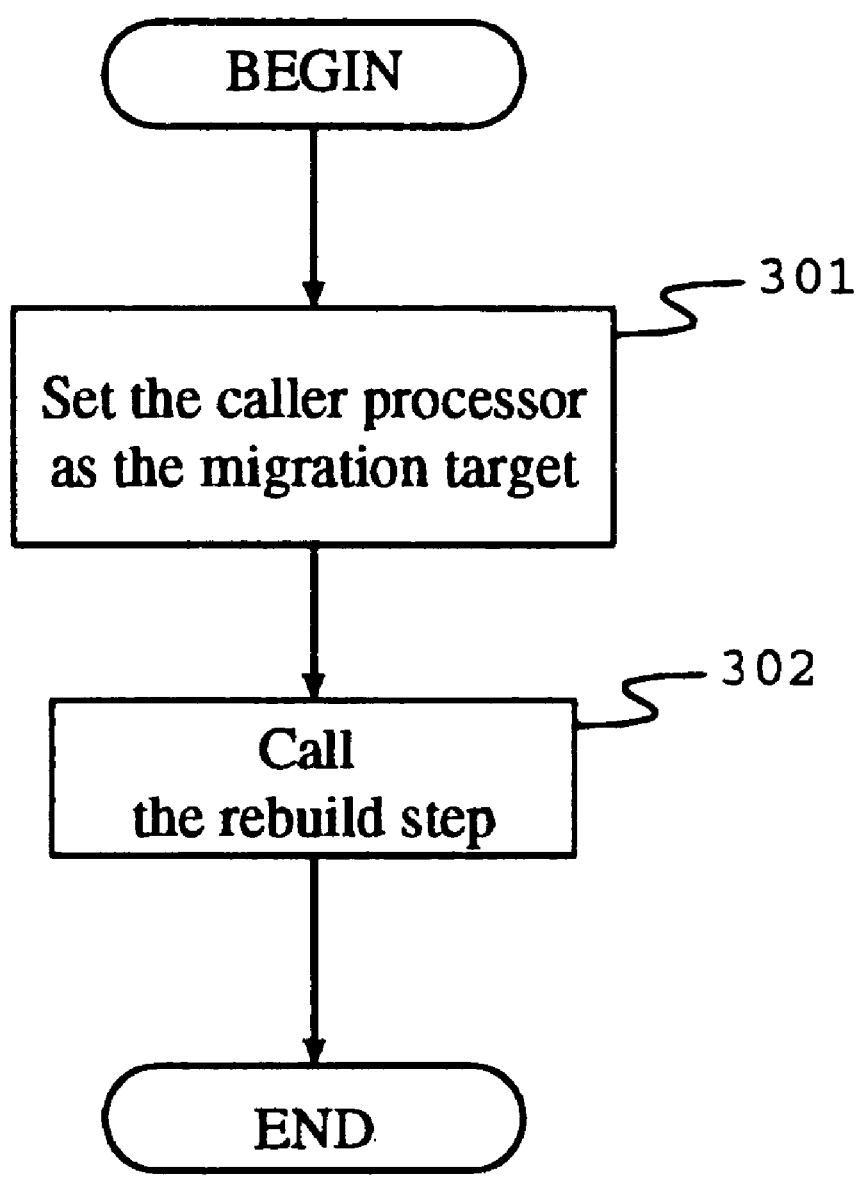
FIG. 3 shows a flow chart of one embodiment of a watch step.

An example of process executed by the watch step of FIG. 1 is shown in FIG. 3.

The watch step is started when process to be executed is exhausted in each process. Since the watch step is executed by the processor which is currently idle, the inherent performance of the system is not lowered by the execution of the watch step.

In the watch step shown in FIG. 3, the watch step sets the processor which started the step as a migration target processor (301) and calls the rebuild step 130 (302). The processor number of the migration target processor is notified to the rebuild block by using an argument.

Figure 7:
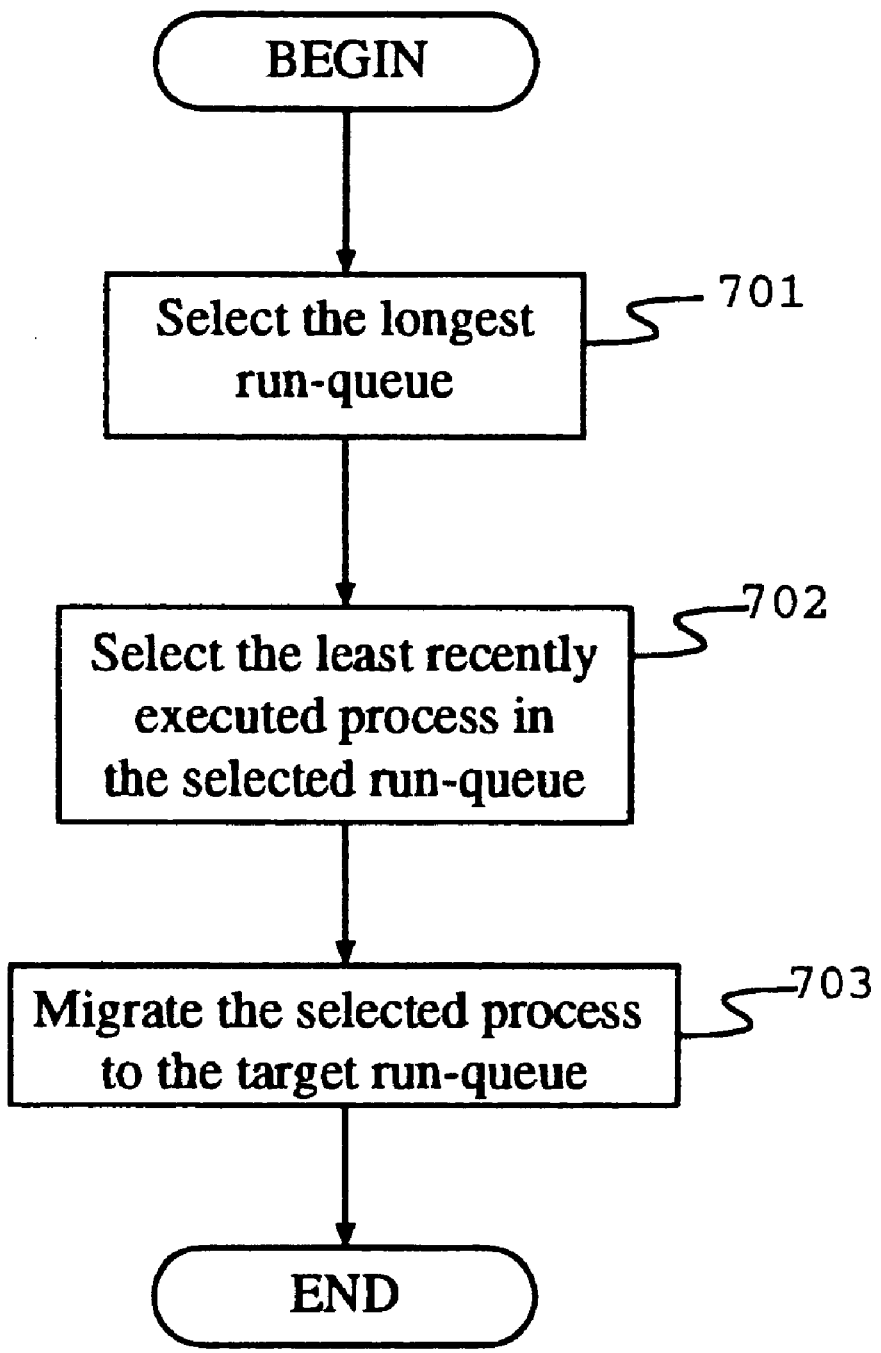
FIG. 7 shows a flow chart of an embodiment of a rebuild step.

A step executed by the rebuild step 130 is shown in FIG. 7. In the rebuilding step of the present example, a longest run queue in the system (the run queue lengths of the respective processors are stored in a process management table of an OS) is selected (701), and a process which has least recently been executed by the processor in the selected run queue is selected (702), and that process is migrated to the run queue of the migration target processor (set by the watch step) (703).

While the process is migrated between run queues, the rebuild step must lock the run queues of the source processor and the migration target processor and conduct the exclusive control (specifically, control to prevent a plurality of processors from concurrently accessing the same data structure based on the lock information) so that other steps do not access the data structure (run queue).

Figure 2:
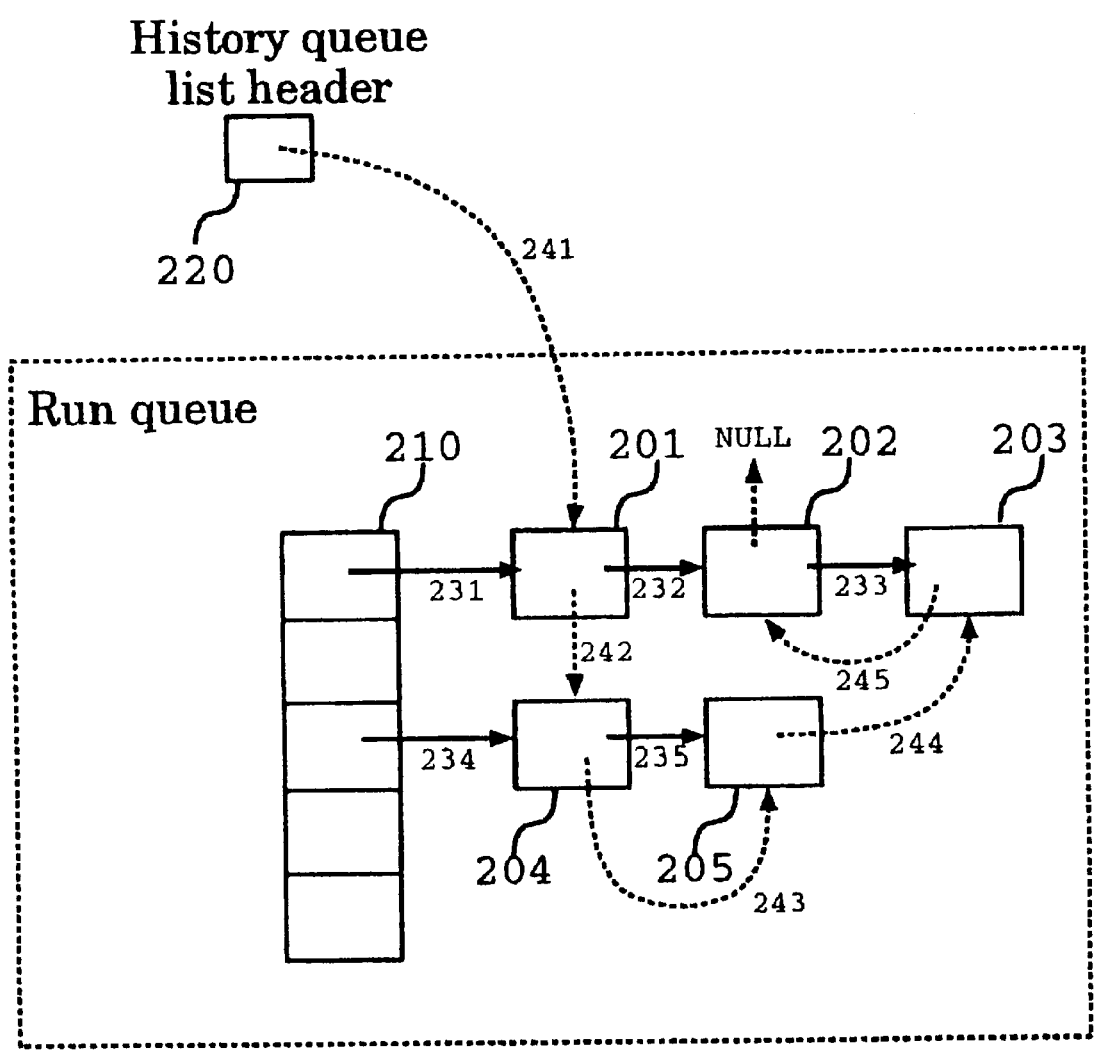
FIG. 2 shows an embodiment of a process queue and a history queue of the computer system of the present invention.

A data structure which the computer of the present embodiment is provided to select the process which has least recently been executed by the processor from the run queue in the step 702 is shown in FIG. 2.

Each processor has the data structure of FIG. 2 for each processor although the numbers of processes in the run queues and the list chains may differ from processor to processor. In the data structure of FIG. 2, the execution priority of the process assigned to the processor and the sequence of the recently executed processes are managed in the following manner.

The processes in the run queue are managed in the following manner for each execution priority. Numeral 210 denotes an array of pointers and each element of the pointer 210 points a head of a list of the processes having the same priority. In FIG. 2, the priorities of the processes 201, 202 and 203 are equal and the priorities of the processes 204 and 205 are equal. Processes to be executed and information for building the list of the processes (for example, pointer to other process) are stored in 201~205. Solid line arrows (231, 232, 233, 234, 235, 236) indicate chains of list of the processes having the same priority.

The processes recently executed (dispatched) by the processor are managed by a history queue in the following manner. The most recently dispatched process is pointed by a history queue header 220. The recently dispatched processes are chained in the history queue in the descending order of dispatch. In FIG. 2, the processes 201, 204, 205, 203 and 202 are newer in this order. Broken line arrows (241, 242, 243, 244, 255) indicate chains of the history queue list. The processor inserts a process at the top of the history queue list for each dispatch. As a result, the content of the history queue header 220 (pointer to the top process) is updated.

In order to select the least recently executed process from the run queue, the bottom process of the history queue may be selected. For example, in FIG. 2, the process 202 is selected.

The data structure shown in FIG. 2 is provided for each processor in the system.

Each time the processor dispatches a process, it adds the process to be dispatched to the top of the history queue corresponding to its own. Thus, the history queue holds the dispatch processes of the corresponding processors in the order of dispatch by the list structure. The rebuild step compares the entry position from the top of the history queue (the position number counted from the top) for each process in the run queue to determine the order of the last dispatch of the respective processes by the processor. Thus, by selecting the process which is located most backward from the top of the history queue (202 in FIG. 2), from the processes on the run queue, the least recently executed process may be selected.

Figure 4:
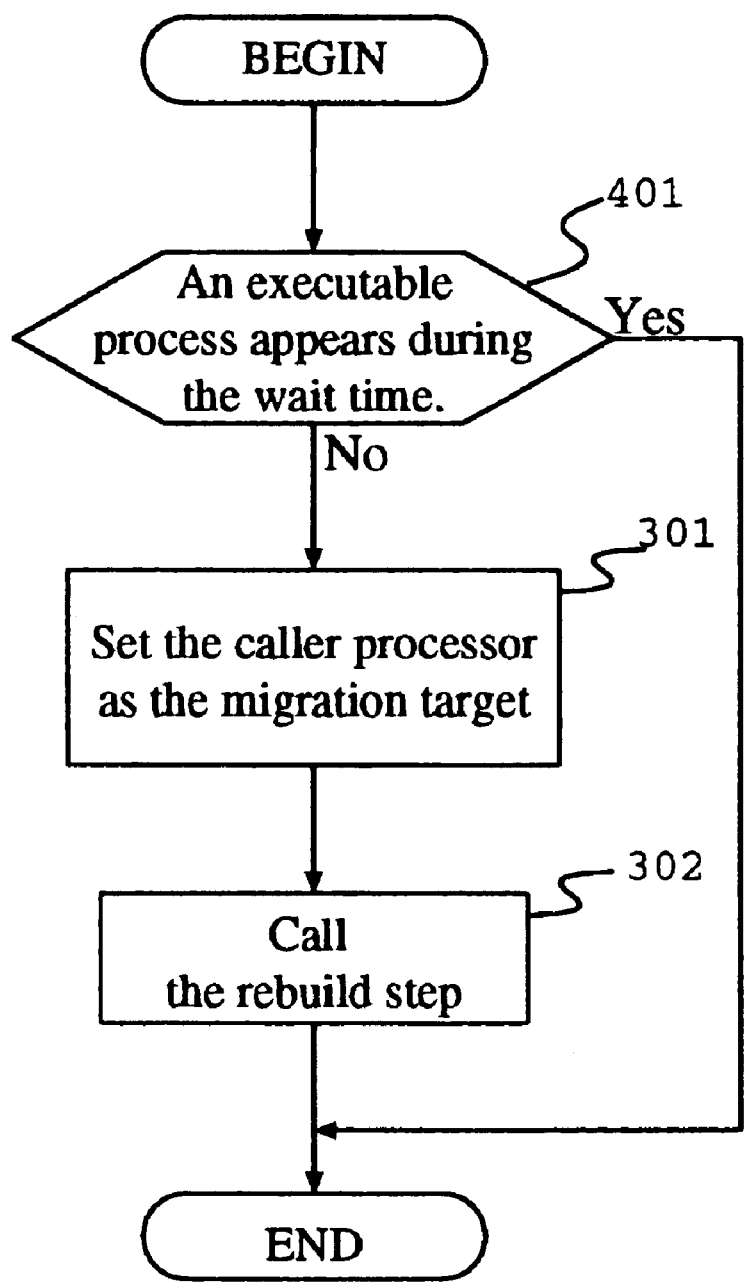
FIG. 4 shows a flow chart of a second embodiment of the watch step.

A second embodiment of the watch step 120 is shown in FIG. 4. This step is started when the processes to be executed are exhausted in each processor. The processor waits a non-process state for a fixed time (401). When an executable process appears during the wait time, the processor terminates the watch step. When the non-process state continues for the fixed time, the processor is set as a migration target processor and the rebuild step is called (402).

Figure 5:
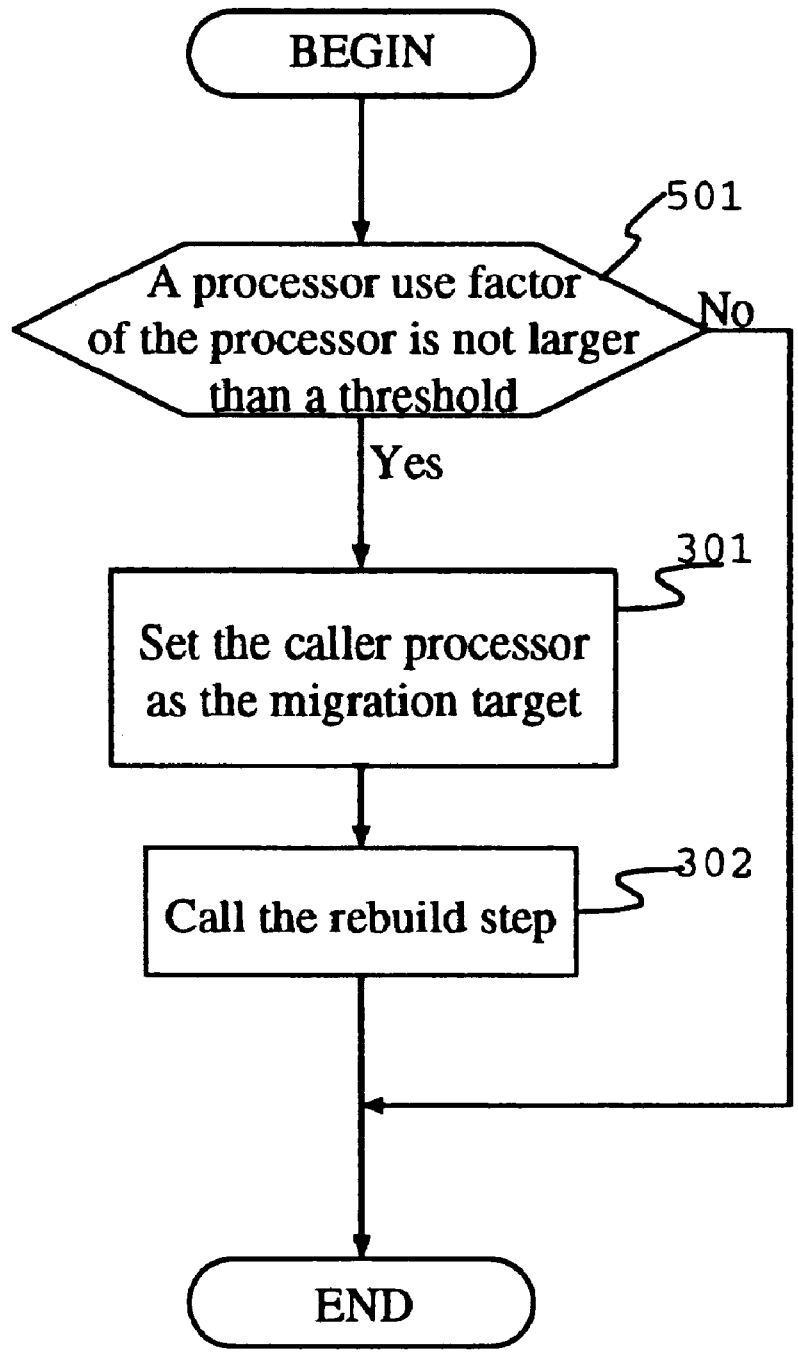
FIG. 5 shows a flow chart of a third embodiment of the watch step.

A third embodiment of the watch step 120 is shown in FIG. 5. In the present embodiment, each processor starts the watch step for each interval (at a predetermined interval). When a processor use factor of the processor (a ratio of busy time of the processor to a total time) is not larger than a threshold (501), the processor is set as the migration target processor (301) and the rebuild step is called (302).

Figure 6:
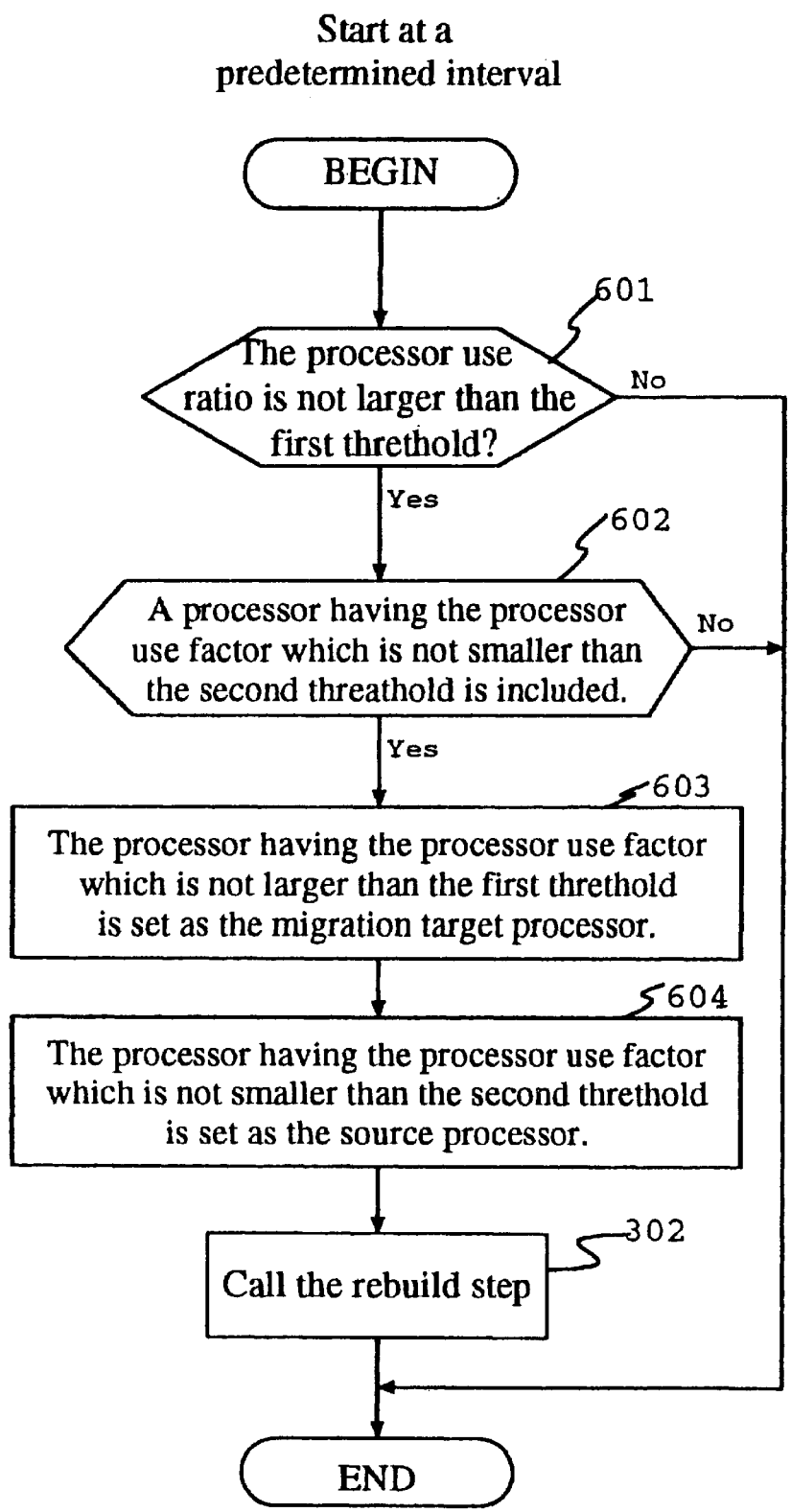
FIG. 6 shows a flow chart of a fourth embodiment of the watch step.

A fourth embodiment of the watch step 120 is shown in FIG. 6. In the present embodiment, each processor starts the watch step for each interval (at a predetermined interval). The processor determines whether the processor use ratio (factor) is not larger than a first threshold or not (601). If the decision is false (NO), the watch step is terminated. If the decision is true (YES), the processor determines whether a processor having the processor use factor which is not smaller than a second threshold is included or not (602). If the decision is false (NO), the watch step is terminated. If the decision is true (YES), the processor having the processor use factor which is not larger then the first threshold is set as the migration target processor (603) and the processor having the processor use factor which is not smaller than the second threshold is set as a source processor (604), and the rebuild step is called (605).

Figure 8:
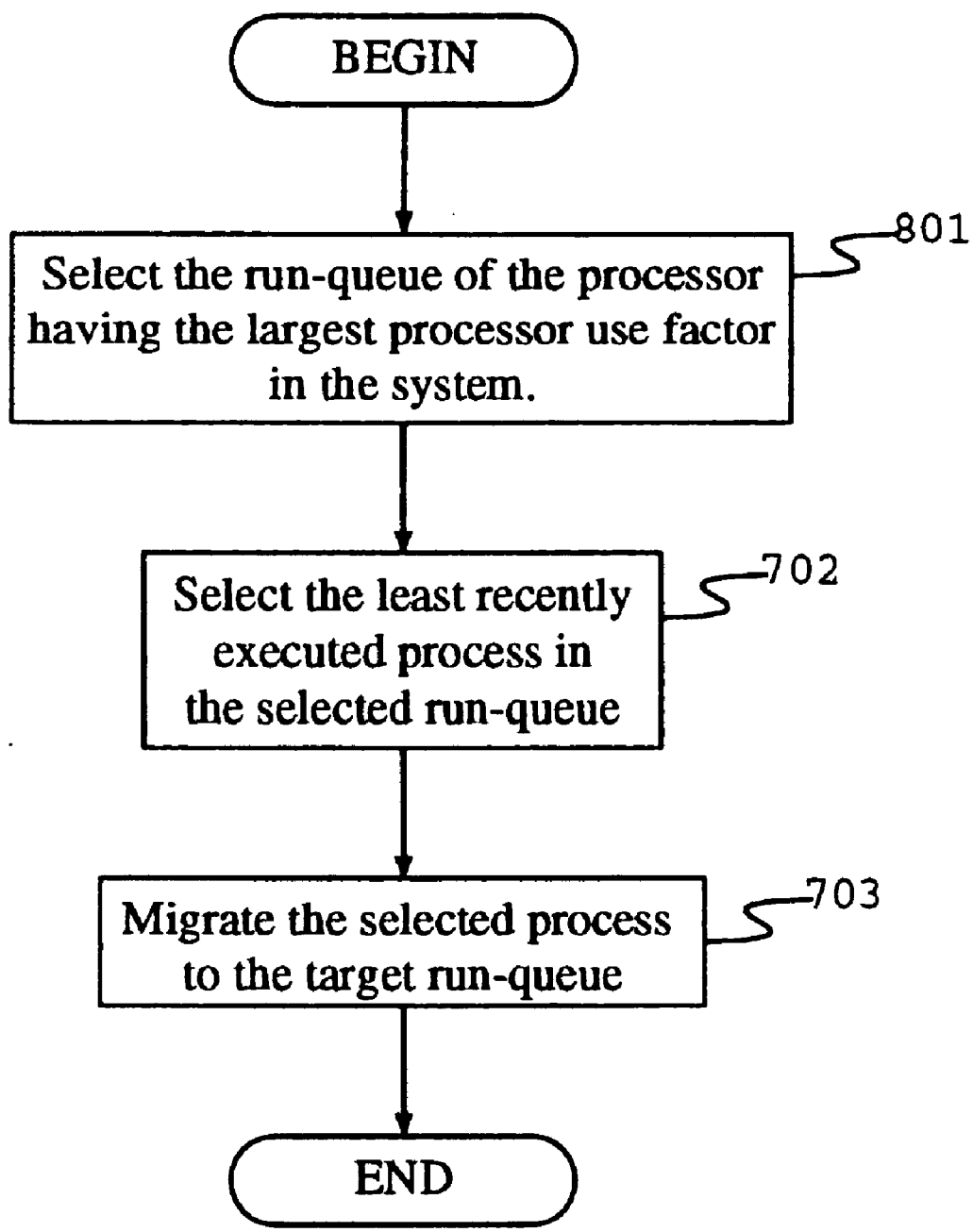
FIG. 8 shows a flow chart of a second embodiment of the rebuild step.

A second embodiment of the rebuild step 130 in the process management system having any one of the watch steps 120 shown in FIGS. 3, 4 and 5 is shown in FIG. 8. The present rebuild step is called from the watch step, the run queue of the processor having the largest processor use factor in the system (the processor use factor is recorded by the OS for each processor and updated at a predetermined interval) is selected (801), the least recently executed process in the selected run queue is selected (by the history queue) (702), and the selected process is migrated to the migration target run queue (703).

Figure 9:
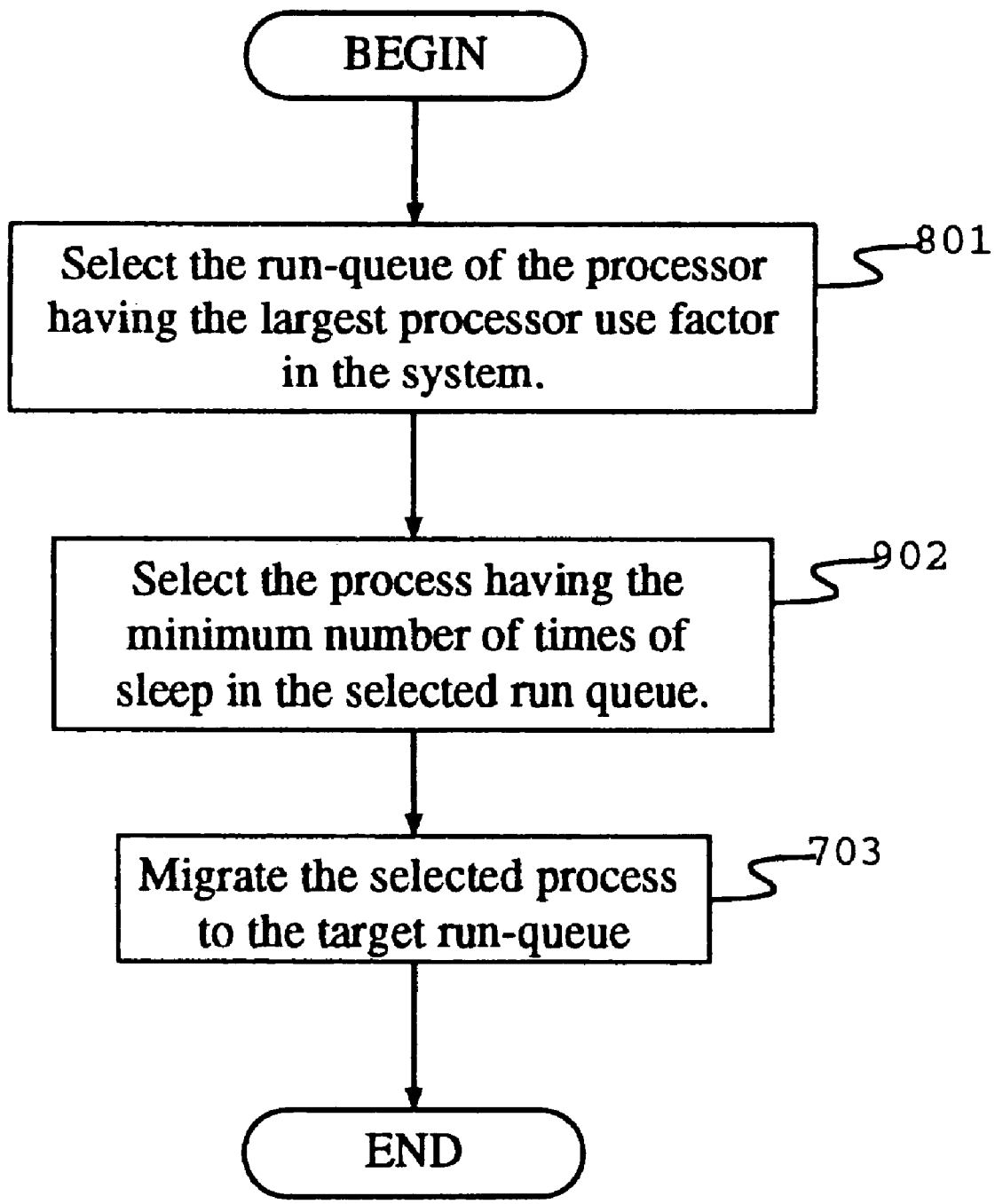
FIG. 9 shows a flow chart of a third embodiment of the rebuild step.

A third embodiment of the rebuild step 130 is shown in FIG. 9. The present rebuild step is called from the watch step, the run queue of the processor having the largest processor use factor in the system is selected (901), the process having the minimum number of times of sleep (the number of times of sleep for waiting an event, which is recorded in a counter of a process management table of the OS) in the selected run queue is selected (902), and the selected process is migrated to the migration target run queue (703).

Figure 10:
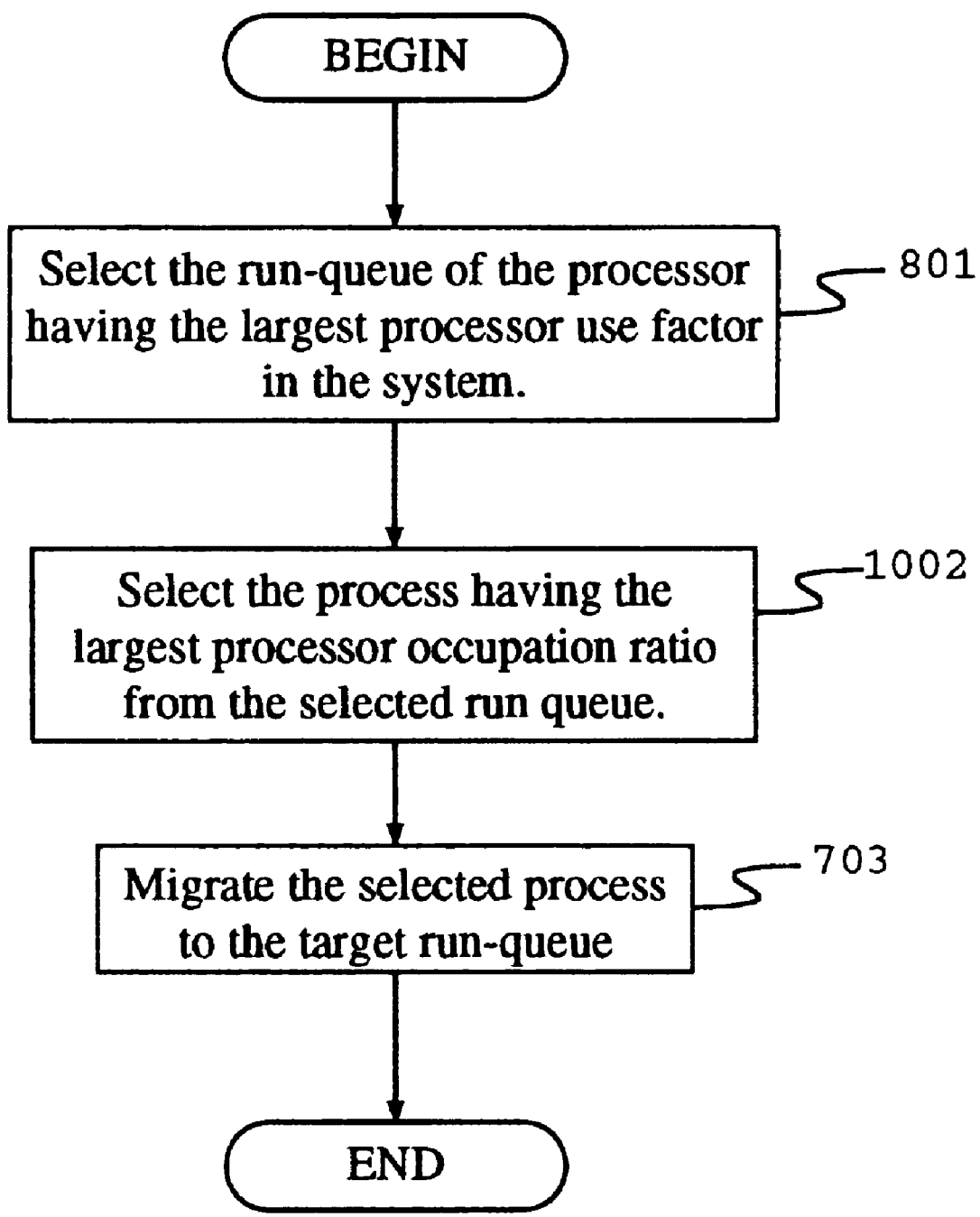
FIG. 10 shows a flow chart of a fourth embodiment of the rebuilding step.

A fourth embodiment of the rebuild step 130 is shown in FIG. 10. The present rebuild step is called from the watch step, the run queue of the processor having the largest processor use ratio (factor) in the system is selected (801), the process having the largest processor use ratio (factor) is selected from the selected run queue (1002) and the selected process is migrated to the migration target run queue (703).

Figure 11:
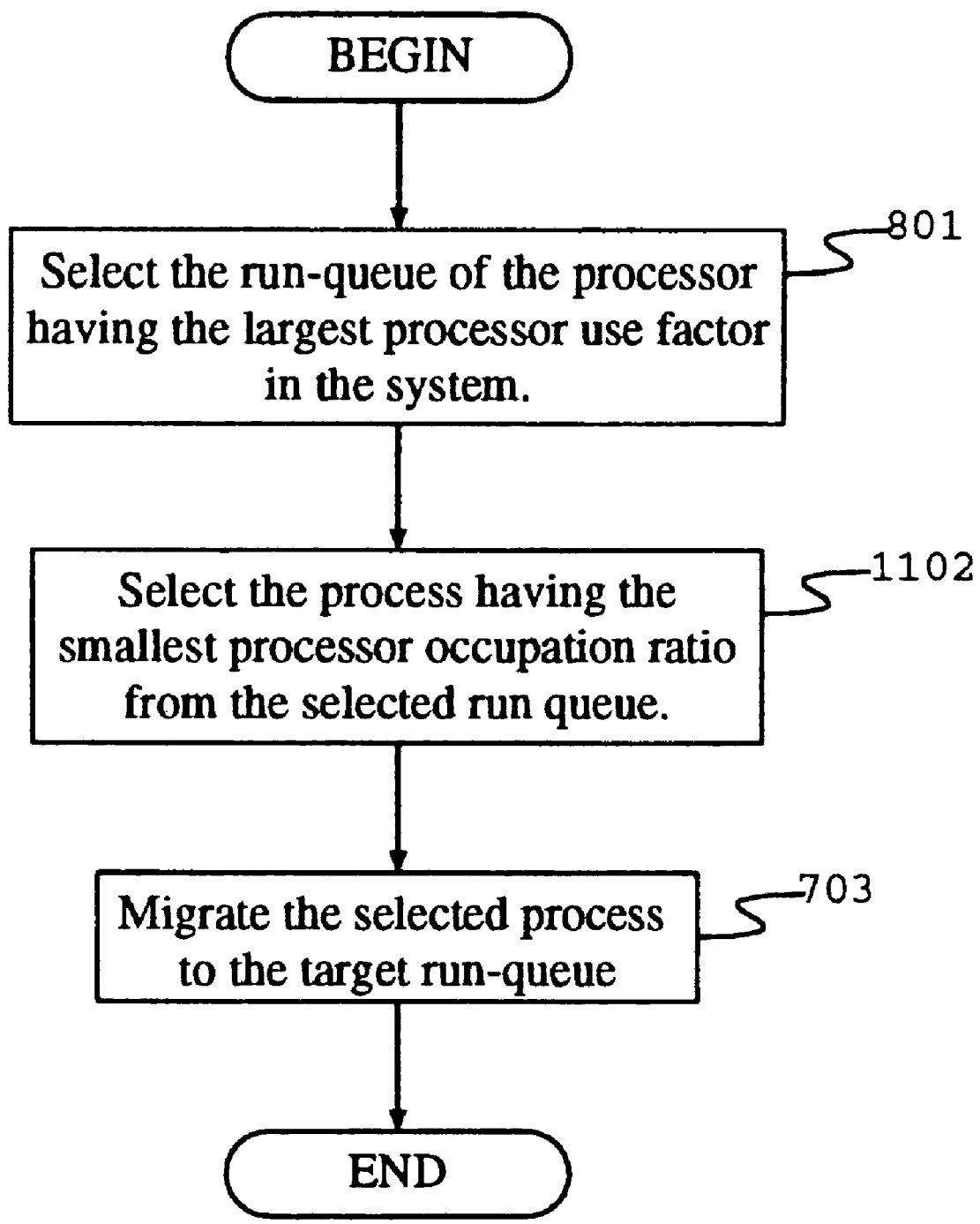
FIG. 11 shows a flow chart of a fifth embodiment of the rebuild step.

A fifth embodiment of the rebuild step 130 is shown in FIG. 11. The present rebuild step is called from the watch step, the run queue of the processor having the largest processor use ratio (factor) in the system is selected (801), the process in the selected run queue having the smallest processor occupation ratio (factor) (a ratio of a time of use of the processor by a process for the execution of the process, to a total time) is selected (1102), and the selected process is migrated to the migration target run queue (703).

Figure 12:
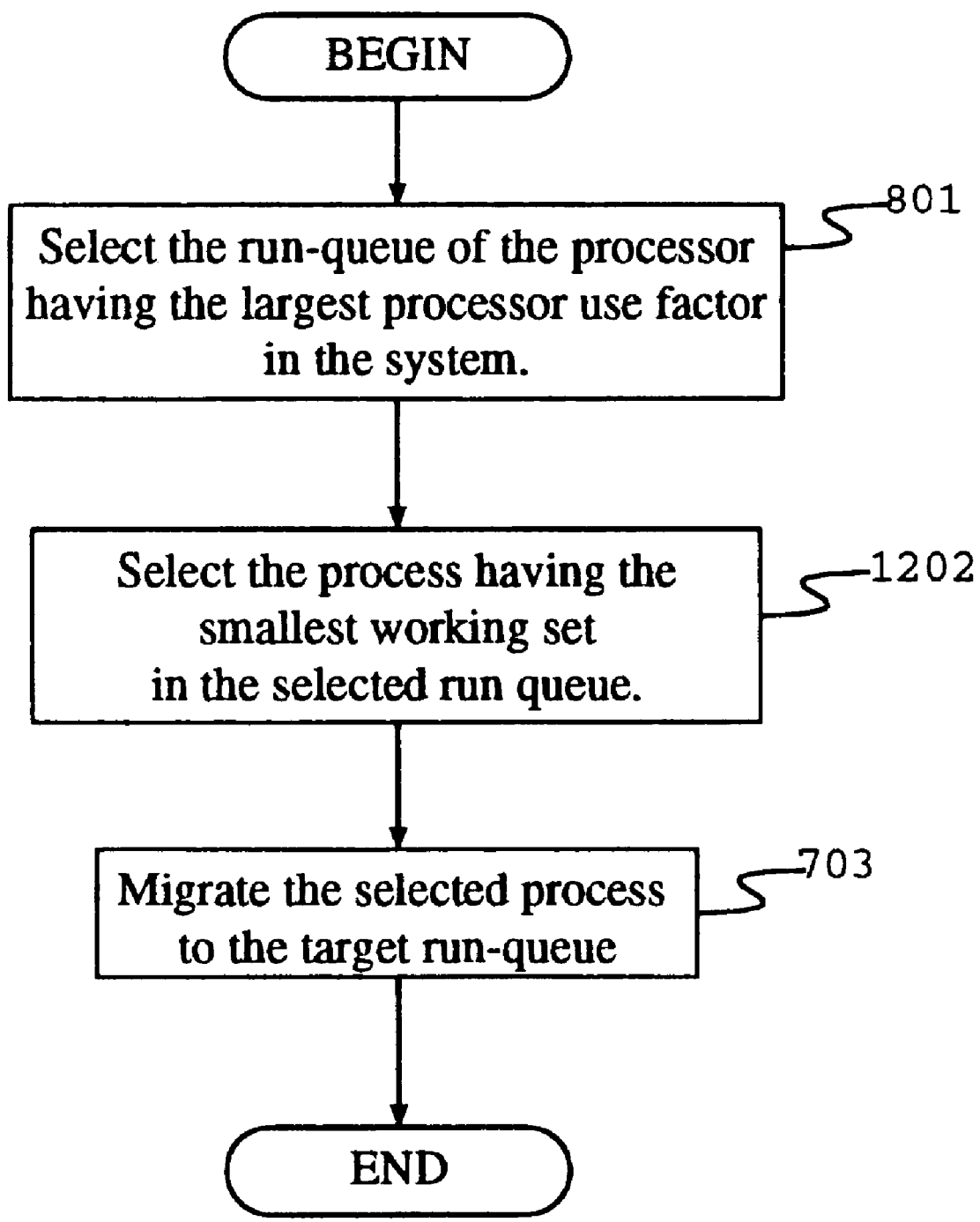
FIG. 12 shows a flow chart of a sixth embodiment of the rebuild step.

A sixth embodiment of the rebuild step 130 is shown in FIG. 12. The present rebuild step is called from the watch step, the run queue of the process having the largest processor use factor in the system is selected (801), the process in the selected run queue having the smallest working set (the number of pages (memory range) accessed by the process during the execution of the process) is selected (1202) and the selected process is migrated to the migration target run queue (803).

Figure 13:
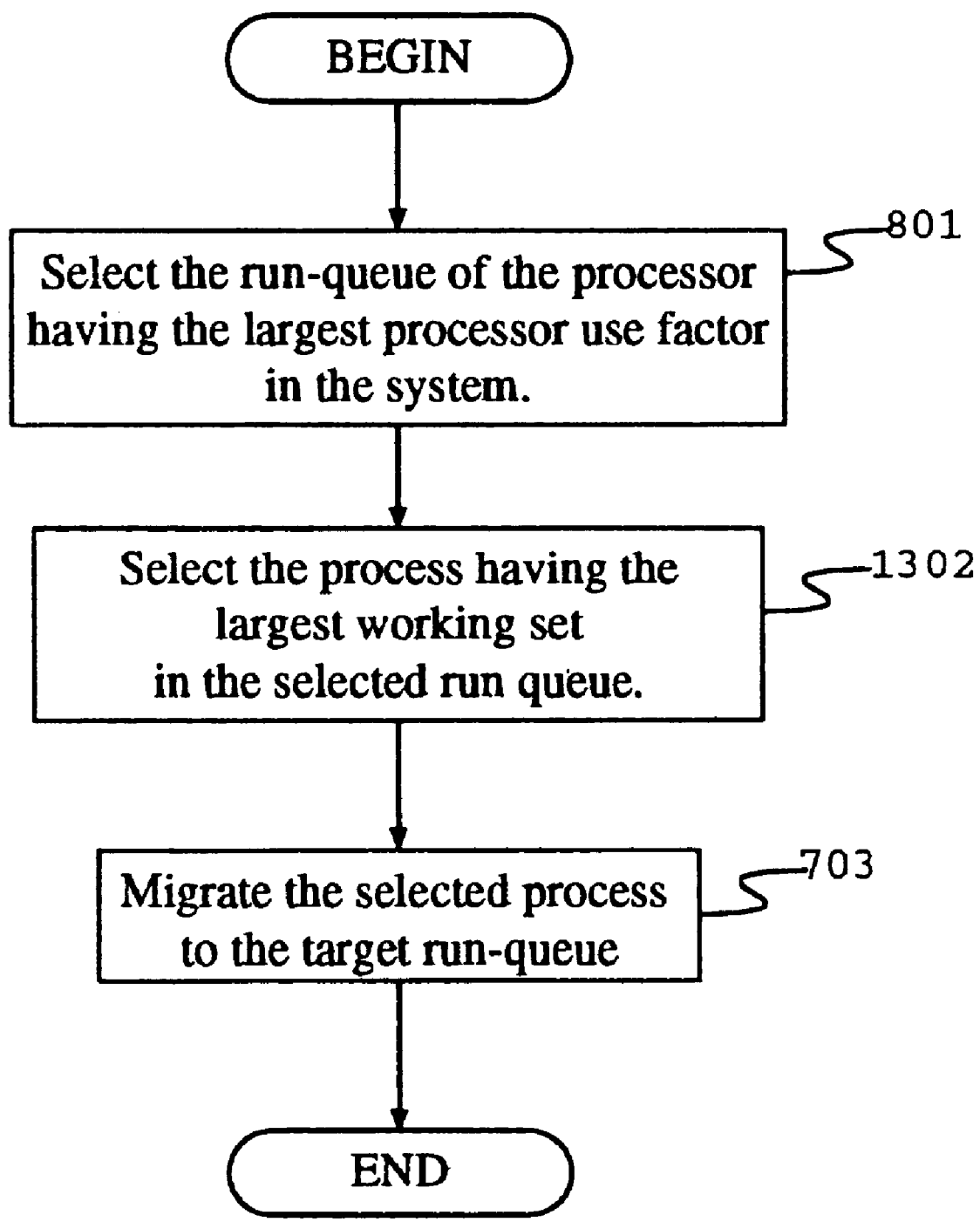
FIG. 13 shows a flow chart of an eighth embodiment of the rebuilding step.

Other embodiment of the rebuild step 130 is shown in FIG. 13. The present rebuild step is called from the watch step, the run queue of the process having the largest processor use factor in the system is selected (801), the process having the largest working set in the selected run queue is selected (1302), and the selected process is migrated to the migration target run queue (703).

By providing the run queue which holds the executable processes in each processor, each processor can parallelly extract the executable process from the run queue except when the rebuild step accesses the run queue. Thus, the parallelism of the execution of the system is enhanced.

When watch step calls the rebuild step when the process to be executed by the processor is exhausted, the migration is conducted by the processor which is currently idle so that the system throughput is not reduced compared with the case where the migration is not conducted.

When the watch step calls the rebuild step when the process to be executed by the processor is exhausted and that state lasts for the predetermined period, a possibility of conducting unnecessary migration is reduced because one of the processes assigned to the processor may become executable after the idling.

When the watch step calculates the processor use factor at the predetermined time interval, compares it with the threshold of the processor use factor and notifies it to the rebuild step, the migration is made uniform along the time axis and the abrupt change of the load in the system is avoided.

When the rebuild step migrates the least recently executed process, the process having the lowest processor occupation factor or the process having the smallest working set, the process having less remaining information in the private cache is selected for each processor and the overhead for the cache coherency control is reduced.

When the rebuild step selects the process having the small number of times of sleep, the process having the high processor occupation factor or the process having the large working set, the effect per number of times of migration is increased and the load balancing is attained with a smaller number of times of migration.

What is claimed is:

1. A process management method for a memory shared multi-processor computer in which a plurality of processors share a main memory and each of said processors extracts a process for execution from one of a plurality of run queues, each run queue holding executable processes, said run queues being included in said main memory, said process management method comprising the steps of:
   extracting, by each processor, the process for execution from the run queue provided for each processor;
   conducting by each processor a watch step for monitoring process execution status and the run queue to notify rebuilding of the run queue to a rebuild step; and
   conducting, by said each processor on said main memory, the rebuild step for rebuilding run queues of other processors and the run queue of said each processor in response to the notice.

2. A process management method according to claim 1 wherein when processes to be executed in one processor is exhausted, the watch step notifies the rebuilding to the rebuild step by setting the one processor as a process migration target processor.

3. A process management method according to claim 1 wherein when processes to be executed in one processor are exhausted and that state lasts for a predetermined time, the watch step notifies the rebuilding to the rebuild step by setting the one processor as a process migration target processor.

4. A process management method according to claim 1 wherein when a processor use factor of one processor calculated at a predetermine time interval is not larger than a threshold, the watch step notifies the rebuilding to the rebuild step by setting the one processor as a process migration target processor.

5. A process management method according to claim 1 wherein the watch step calculates a processor use factor at a predetermined time interval, and when the use factor of one processor is not larger than a first threshold and a use factor of any one of other processors is not smaller than a second threshold, the watch step notifies the rebuilding to the rebuild step by setting the processor having the use factor not larger than the first threshold as a process migration target processor.

6. A process management method according to claim 1 wherein the rebuild step selects the least recently executed process in the processes included in the longest run queue and migrating the selected process to the run queue of the process migration target processor.

7. A process management method according to claim 1 wherein the rebuild step selects the least recently executed process in the processes included in the run queue corresponding to the processor having the largest processor use factor of the plurality of processors and migrating the selected process to the run queue of the process migration target processor.

8. A process management method according to claim 1 wherein the rebuild step selects the process having the smallest number of times of sleep for waiting the occurrence of an event in the computer after the creation of the process, from the processes included in the run queue corresponding to the processor having the largest processor use factor in the plurality of processors and migrates the selected process to the run queue of the process migration target processor.

9. A process management method according to claim 1 wherein the rebuild step selects the process having the largest processor occupation factor from the processes included in the run queue corresponding to the processor having the largest processor use factor in the plurality of processors and migrates the selected process to the run queue of the process migration target processor.

10. A process management method according to claim 1 wherein the rebuild step selects the process having the smallest processor occupation factor from the processes included in the run queue corresponding to the processor having the largest processor use factor in the plurality of processors and migrates the selected process to the run queue of the process migration target processor.

11. A process management method according to claim 1 wherein the rebuild step selects the process having the smallest working set size from the processes included in the run queue corresponding to the process having the largest processor use factor in the plurality of processors and migrates the selected process to the run queue of the process migration target processor.

12. A process management method according to claim 1 wherein the rebuild step selects the process having the largest working set size from the processes included in the run queue corresponding to the processor having the largest processor use factor in the plurality of processors and migrates the selected process to the run queue of the process migration target processor.

13. A process management system of a memory shared multi-processor computer comprising:

a plurality of processors which share a main memory, each processor extracts a process for execution from one of a plurality of run queues, each run queue holding executable processes, said run queues being included in said main memory, wherein each processor extracts the process for execution from the run queue provided for each processor, wherein said each processor conducts a watch step for monitoring process execution status and the run queue to notify the rebuilding of the run queue to a rebuild step, and wherein said each processor conducts, on said main memory the rebuild step for rebuilding run queues of other processors and the run queue of said each processor in response to the notice.

* * * * *